June 29, 1943.    C. W. BAIRD    2,323,081
VIBRATION AMPLITUDE CONTROL SYSTEM
Filed March 28, 1942
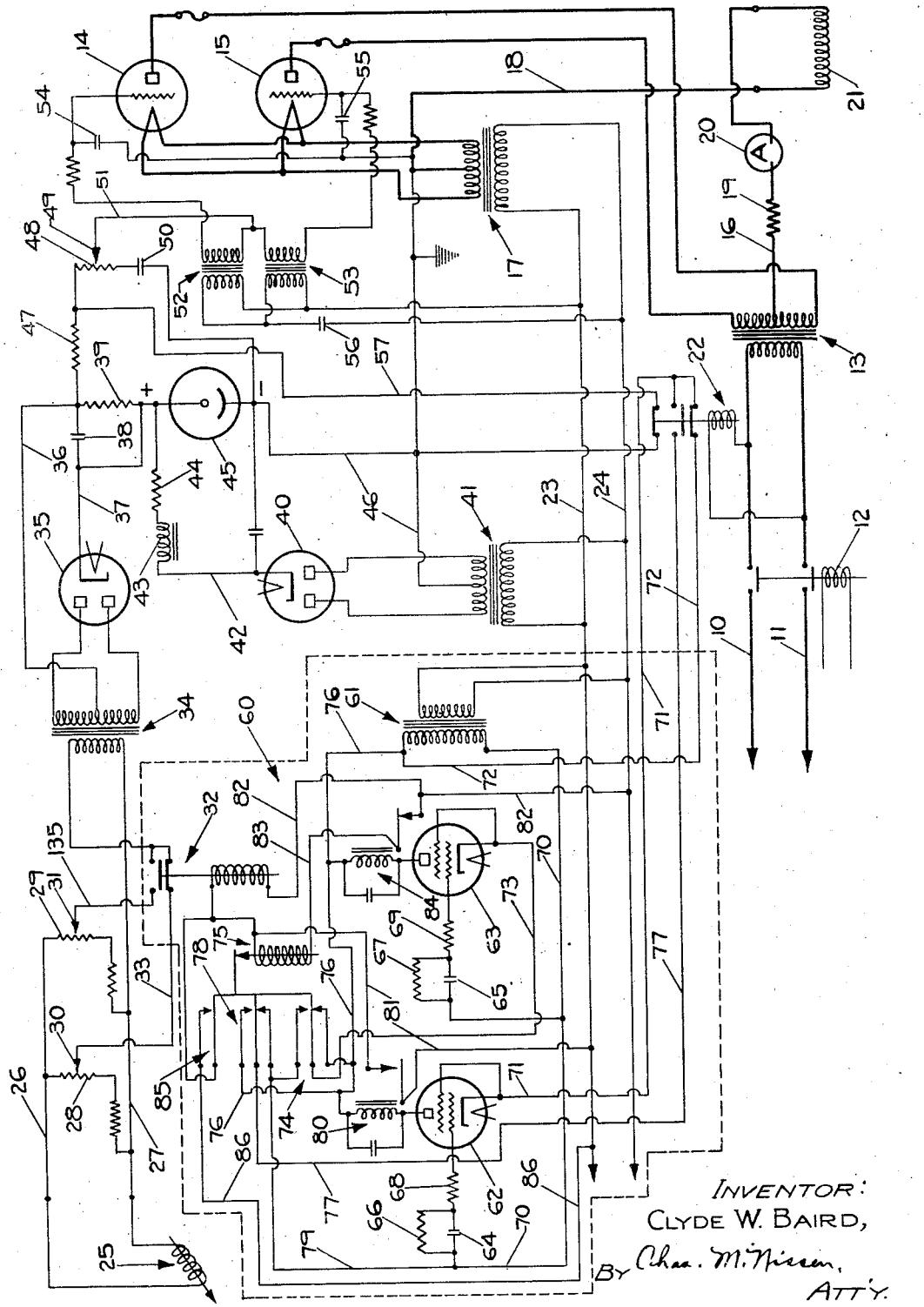
INVENTOR:
CLYDE W. BAIRD,
By Chas. M. Nissen,
ATT'Y.

UNITED STATES PATENT OFFICE 2,323,081

VIBRATION AMPLITUDE CONTROL SYSTEM

Clyde W. Baird, Columbus, Ohio, assignor to The Traylor Vibrator Company, a corporation of Colorado Application March 28, 1942, Serial No. 436,699

10 Claims. (Cl. 172—126)

This invention relates to a vibration amplitude control system and particularly to such a system including mechanism to adjust automatically the amplitude of vibration or the feed rate of a feeder so that it first operates at one preferably predetermined amplitude of vibration or feed rate for a predetermined time and then at any predetermined amplitude of vibration for a succeeding period of time.

A further object of the invention is to provide an improved electron tube type of timing mechanism.

Other objects of the invention will appear hereinafter, the novel features and combinations being set forth in the appended claims.

In the accompanying drawing, the single figure constitutes a wiring diagram of the improved system and timing device comprising my invention.

Referring to said drawing, the power circuit is shown in heavy lines and the control circuit in light lines, said power circuit including a pair of power mains 10 and 11 which derive power from any source of alternating current such as a source of 110, 220 or 440 volts. Said power mains 10 and 11 are controlled by a switch such as a magnetic switch 12, the details of which are well known in the art. The power mains 10 and 11 are connected to the primary of a power transformer 13, the secondary of which is connected to two power electronic tubes 14 and 15, which are preferably of the gaseous type, so that said tubes are connected to form a full wave rectifier, the output circuit thereof leading from the center tap of the secondary of transformer 13 by way of conductor 16 and from the cathode or filaments of said tubes 14 and 15 through the center tap of the secondary of filament heating transformer 17 for the filaments of tubes 14 and 15, by way of conductor 18. Said output circuit provided by conductors 16 and 18 lead through a protecting resistor 19 and ammeter 20 to a coil 21 which is preferably the direct current armature coil of a push pull type vibratory motor of a push pull type vibratory conveyor or the like. For example, the coil 21 may correspond with the coil 28 of the push pull motor illustrated particularly in Figs. 6, 7 and 8 of the patent to John A. Traylor, No. 1,772,596, dated August 12, 1930. This particular patent illustrates the motor attached to a screen but such motors have been employed for a number of years by The Jeffrey Manufacturing Company of Columbus, Ohio, in connection with their push pull type vibratory conveyors as well as in connection with screens and other items.

Also connected across the power mains 10 and 11 and controlled by switch 12 is a relay 22 having upper and lower normally closed contacts and intermediate normally open contacts, the functions of which will be described hereinafter.

The above described transformer 17 is connected across lines 23 and 24 which are energized from the same source of alternating current that energizes power mains 10 and 11 and are controlled by an appropriate switch not shown. In the operation of the system, conductors 23 and 24 are energized before switch 12 is closed, giving time for the filaments of tubes 14 and 15 to become heated and also to start in operation the timer, as hereinafter described in full detail.

The system includes an automatic amplitude control branch or leg so that the amplitude of vibration of the vibratory motor or conveyor is maintained substantially constant at any one of two pre-selected values depending upon which of two alternate connections are made, as hereinafter described in detail.

The automatic control of the amplitude of vibration is fundamentally the same as disclosed and claimed in my application for Vibration control apparatus, Serial No. 433,538, filed March 6, 1942.

It may be stated, however, that in the system disclosed in the instant application the frequency of vibration of the vibratory motor or conveyor is determined by the frequency of the alternating current which is supplied to the alternating current field coils thereof and is not determined by the natural period of vibration of the motor or conveyor as it is in my application, Serial No. 433,538. That is, I only employ the amplitude control feature of application Serial No. 433,538 in the instant case and do not employ the frequency control feature thereof.

I shall now describe this amplitude control construction. A magnetic pickup device 25 is provided which is controlled by the amplitude of vibration of said motor or conveyor and this pickup device may have the structure disclosed more completely in my application, Serial No. 297,622, entitled Vibrating apparatus control, filed October 2, 1939, now Patent No. 2,287,223, dated June 23, 1942, or it may have any other desired form so long as the voltage generated therein is proportional to the amplitude of vibration of said motor or conveyor of which coil 21 is a part.

The terminals of pickup 25 are connected to conductors 26 and 27 between which is connected a pair of rheostats 28 and 29 having variable taps 30 and 31, respectively. Tap 30, associated with rheostat 28, is connected through the normally closed lower contacts of a magnetic switch or relay 32 by way of branch conductor 33 to one terminal of the primary winding of a stepup transformer 34, the other terminal of which primary winding is connected permanently to conductor 27. Tap 31, associated with rheostat 29, is connected through the normally open upper contacts of said magnetic switch or relay 32 by way of branch conductor 135 to one terminal of said primary winding of transformer 34. It may be noted at this time that when relay or magnetic switch 32 is in its normal or deenergized position, as illustrated in the drawing, the voltage delivered to the primary of transformer 34 will be determined by the position of tap 30 on rheostat 28 and this will produce one predetermined amplitude of vibration of the vibratory motor or conveyor. When the switch or relay 32 is energized, preferably for predetermined time intervals, the amplitude of vibration of the vibratory motor or conveyor will be determined by the position of tap 31 on rheostat 29 and this will produce such an amplitude of vibration which is different from and preferably lower than that produced when relay 32 is deenergized.

Connected to the secondary of transformer 34 is a full wave rectifier tube 35 which produces a direct current flow in conductors 36 and 37 across which is a filter condenser 38, said current flowing through a resistor 39 which develops a direct current voltage which is proportional to the voltage delivered to the primary of transformer 34. Likewise this voltage in resistor 39 is proportional to the voltage generated in the pickup 25 for each position of the relay 32 and for each position of the taps 30 and 31. Obviously the voltage in resistor 39 will have a different value for each position of relay 32 and for each position of taps 30 or 31 assuming the same voltage is generated in the pickup 25. In this connection it is, of course, evident that tap 30 may be adjustable to determine the value at which the amplitude of vibration of the motor or conveyor is maintained constant by the automatic amplitude control system when relay 32 is deenergized and this adjustment may be over a wide range. Tap 31 performs a similar function when relay 32 is energized. The direct current voltage appearing on the terminals of resistor 39 is matched against a substantially constant direct current voltage in bucking relation thereto, so that the resulting voltage may be either zero or reverse polarity or direction and variable in amount in either direction to effect a phase shift of the grid or input alternating current voltage of the tubes 14 and 15 with respect to their plate or output circuit voltage as described in my application, Serial No. 433,538, above identified. To this end I provide a substantially constant source of direct current bucking voltage by means of full wave rectifier tube 40 energized from transformer 41 connected across conductors 23 and 24. The direct current output of rectifier tube 40 flows through conductor 42 having in circuit therewith a choke coil 43, resistor 44 and leading to one terminal of resistor 39, thence through substantially constant voltage determining gaseous discharge tube 45, the other terminal of which is connected by conductor 46 to the center tap of the secondary of transformer 41. Such a system provides a substantially constant direct current voltage drop across the terminals of the gaseous discharge tube 45. One terminal of said tube 45 is connected to a terminal of resistor 39, as above stated, and the other terminal is extended by conductor 46 to the filaments or cathodes of tubes 14 and 15 by virtue of a connection to the center tap of transformer 17. Connected across the free terminals of the resistor 39 and the tube 45 is a time delay circuit including a resistor 47, a resistor 48, having a variable tap 49 associated therewith and a condenser 50. Extending from the variable tap 49 is a conductor 51 which leads to a common terminal on the secondaries of transformers 52 and 53, the free terminals of which secondaries are connected through current limiting resistors to the grids of tubes 14 and 15, respectively. Also associated with the grid-cathode circuit of said tubes 14 and 15 are protecting condensers 54 and 55. The transformers 52 and 53 are energized in parallel from the conductors 23 and 24 through a phase shifting condenser 56 so that the voltages induced in the grid or input circuits of the tubes 14 and 15 are preferably lagging the plate, or cathode-plate, or output, alternating voltages applied to the tubes 14 and 15 by approximately 90 degrees.

From the above description it is manifest that the cathode-grid, input or control circuit for each of the tubes 14 and 15 includes therein an alternating voltage which is normally lagging with respect to the output voltage as provided by transformers 52 and 53, respectively. Superposed on this is a direct current voltage determined by the voltage drop existing between conductors 36 and 46, or, in other words, across the free terminals of resistor 39 and tube 45.

When the amplitude of vibration of the vibratory motor or conveyor has a certain value, which value has no particular significance, the voltage drop across resistor 39 will equal the voltage drop across tube 45 and since these voltages buck each other the D. C. voltage across conductors 36 and 46 will be zero. Under these conditions there will be no direct current voltage superposed on the alternating current voltage in the input circuit of each tube 14 and 15. This particular condition has no significance except for purposes of explanation as it does not necessarily represent the condition of normal vibration. If the voltage developed across resistor 39 is greater than that developed across tube 45, conductor 36 and consequently the grids of tubes 14 and 15 will be positive with respect to the filament in an amount determined by the amount the voltage drop across resistor 39 exceeds that across tube 45. Conversely, if the voltage drop across resistor 39 is less than that across tube 45, conductor 36 and consequently the grids of tubes 14 and 15 will be negative with respect to the filaments or cathodes thereof by an amount determined by the difference in these voltages.

This superposed D. C. voltage in a positive or negative sense, as determined from the grid, is effective to shift the normal 90 degrees lagging phase relation between the input and output voltages of the tubes 14 and 15 and the amount of the shift is determined by the value of the resulting superposed D. C. voltage. When the grid is made positive, the shift will be to bring the grid and alternating current plate voltages more in phase and thus increase the current flow to the winding 21. Conversely, if the resulting D. C. voltage is negative on the grids, the input voltage will be more out of phase with the output or plate voltage and thus decrease the current flow to the winding 21. It is evident that for any position of the switch 32 and the taps 30 or 31, whichever is in control at the moment, a stable condition will be realized and whatever conditions are necessary so that upon an increase in the amplitude of vibration of the motor or conveyor the resulting voltage developed in the pickup 25 will tend to decrease said amplitude of vibration and a decrease in the amplitude of vibration of said motor or conveyor will cause such a decrease in the voltage generated in pickup 25 as to increase the current flow to said winding 21. The effect of the time delay circuit including resistors 47 and 48 and condenser 50 is to smooth out rapid variations in voltages which may be developed in resistor 39. Variable tap 49 is provided so as to make available a variable amount of the resulting differential D. C. voltage developed between conductors 38 and 46, as above described.

A conductor 57 is connected between resistors 47 and 48 and leads to conductor 46 through the upper contacts of relay 22 which are closed except when relay 22 is energized. In other words, when the system is first started and when conductors 23 and 24 are energized the transformer 13 is not yet energized and when the system is shut down, conductor 57 will be connected to conductor 46. This forms a shunt circuit for any voltage appearing between conductors 38 and 46 through resistor 47 so it can have no amplitude controlling effect. It also provides a shunt circuit for condenser 50 through resistor 48 to discharge it and maintain it in such a condition until relay 22 is energized as it will be when the system is thrown into full operation by energization of magnetic switch 12.

In certain installations, particularly for vibratory feeders or conveyors, it has been found desirable to operate the feeder or conveyor at a relatively high rate of vibration for a predetermined period of time, then to reduce the vibration and operate it at a reduced rate for another predetermined period of time and then return to the first or high rate of vibration for the first predetermined interval of time and possibly continue this through a number of cycles. In the apparatus which I have provided, this type of control is automatically effected and in the particular embodiment of the invention which I have illustrated, not only is this amplitude of vibration varied cyclically, as above outlined, but the amplitude at which the feeder operates during each predetermined period is maintained substantially constant during that period at a preselected value and in the fullest realization of my invention, this characteristic prevails though in broader aspects it is not essential.

As one aspect of my invention I have provided an improved timer which includes as a part thereof the previously described relay or magnetic switch 32, which timer is indicated as a whole by the reference character 60 and is contained within the dotted line outline seen on the drawing. It is, of course, evident that in certain aspects of the invention any desired type of timer may be employed to operate the contacts associated with the switch 32 but in the full realization of my invention in its most complete aspect, the system includes the particular timer 60 which I shall now describe.

During the initiation of the operation of the system, conductors 23 and 24 are energized before relay 22 is energized, as above mentioned. At this time transformer 61, which has its primary connected across lines 23 and 24, is energized and relay 22 is deenergized with its upper and lower contacts in circuit closing position. Consequently at this time the voltage on the secondary of transformer 61 is applied to the grid-cathode circuits of two vacuum tubes 62 and 63, which tubes have in the grid circuits condensers 64 and 65, respectively, around which are provided shunt resistors 66 and 67, respectively, which may be formed by resistors of variable value to determine the discharging time of said condensers 64 and 65 at predetermined variable values. Protecting resistors 68 and 69 are also connected in the grid circuits of tubes 62 and 63, respectively. During this period, the control grids of said tubes 62 and 63 act as anodes or plates and the electron flow from the cathodes of said tubes 62 and 63 are effective to charge the condensers 64 and 65 so that after a predetermined time said condensers are fully charged so that they present a negative bias on said grids to prevent a current flow through said tubes 62 and 63 until said condensers 64 and 65 are discharged through resistors 66 and 67, respectively, at a predetermined time interval as determined by the value of said resistors, which time interval may be varied by varying their values. These charging circuits for the condensers 64 and 65 may be traced from the secondary of transformer 61 as follows: The lower terminal of the secondary of transformer 61 leads by way of conductor 70 to one terminal of each of the condensers 64 and 65, the other terminals of which condenser are connected to the control grids of said tubes 62 and 63 through resistors 68 and 69, respectively. The cathode of tube 62 is connected to the other terminal of the secondary of transformer 61 by way of conductor 71, normally closed bottom contacts of relay 22 and conductor 72. Thus the control grid and cathode of tube 62 are connected across the terminals of the transformer 61 with the condenser 64 in series. The cathode of tube 63 is connected by way of conductor 73 through the central spring of a lower group of contacts 74 of magnetic relay or switch 75 which is normally in contact, when relay 75 is deenergized, with a lower contact which extends by way of conductor 76 to the upper terminal of the secondary winding of transformer 61. Thus when relay or switch 75 is in its deenergized or normal condition, the circuit will be closed to energize the grid and cathode or input circuit of tube 63 to charge condenser 65. This condition exists until the magnetic switch 12 is closed and when it is closed the relay 22 is energized and its lower and upper contacts are opened and its intermediate contact closed. Since the input circuit of tube 62 by which condenser 64 was charged extends by way of conductors 71 and 72 and of lower contacts of relay 22, this circuit will be broken when said relay 22 is energized and this happens when the vibratory motor or conveyor with which coil 21 is associated starts into operation. Under these conditions the pre-selected amplitude of vibration is preferably high, that is, the deenergized condition of relay 32 which will then exist is preferably high as distinguished from the low amplitude condition. The manner in which the relay 32 is energized after a predetermined time interval shall now be described.

Relay 32 is, under these conditions, deenergized and the vibratory feeder after a very short starting interval reaches its high amplitude of vibration where it is automatically maintained. When relay 22 is energized as aforesaid, breaking the charging circuit for condenser 64, said condenser 64 immediately begins to discharge through resistor 66. After a predetermined time interval this charge leaks off to such an extent that the control grid of tube 62 is no longer sufficiently negative with respect to the cathode to prevent firing or conducting of tube 62 and current then flows through the output, plate or cathode-anode circuit of tube 62 through the output circuit which shall now be traced and which, it is to be particularly noted, includes intermediate contact of relay 22. Said plate circuit of tube 62 extends from the source of voltage provided by the secondary of transformer 61, from the bottom terminal thereof by way of conductor 70 to branch conductor 79 which leads to the lower contact of a group of three contacts 78 associated with the relay or switch 75, which lower contact is normal in engagement of the central spring of group 78 and through said central spring to conductor 77 and through the now closed intermediate contacts of relay 22 to conductor 71 which is connected to the cathode of tube 62. The top terminal of the secondary winding of transformer 61 is connected to the plate or anode of tube 62 through conductor 76 and through the coil of a normally open relay 80 preferably having a condenser connected across its winding. When said tube 62 fires after said predetermined time interval during which the motor is operating at its high rate of vibration and which predetermined time may be adjusted by adjusting the value of the resistor 66 or the condenser 64 or both, preferably, for example, by replacing resistor 66 with resistors of variable value, the current flowing in the plate circuit of tube 62 just described will energize said relay 80 and close its normally open contacts. When this occurs the relays 75 and 32 are energized in parallel by being directed directly across conductors 23 and 24. The circuits for these two relays is as follows: From conductor 23 through conductor 81, now closed contacts of relay 80, continuing through conductor 81 to the upper terminals of the windings of relays 32 and 75. The lower terminal of the winding of relay 32 is connected directly by conductor 82 to conductor 24. The lower terminal of the winding of relay 75 is connected by conductor 83 through the normally closed contacts of relay 84 to conductor 24 by way of a portion of conductor 82. The consequent flow of current through relays 32 and 75, of course, energizes these relays and to move their associated contacts to their upper positions where they are maintained for a predetermined time interval, as hereinafter described.

Relay 32 in moving to its upper position effectively places rheostat 29 in control of the amplitude of vibration of the motor or conveyor and, as above stated, this is the low condition and this condition is maintained for a predetermined time interval and preferably at a predetermined value by the amplitude control mechanism, as above described. Relay or switch 75 in operating, moves the center springs and the groups of contacts 74 and 78 and also the bottom spring of a group of two contacts 85. The breaking of the contacts of group 74 disconnects the previously described charging circuit for condenser 65 associated with tube 63 and this condenser begins to discharge through its associated resistor 67 at a rate which may be variably determined by varying the value of resistor 67, or condenser 65, or both, and after a predetermined time interval the control grid of tube 63 will so reduce its negative bias as to permit tube 63 to fire or become conductive to reset the system and restart the cycle of operation with the motor operating at its high position as hereinafter described more completely.

The switching of the center spring of the group of switches 78 from the bottom contact to the upper contact which was effective when relay 75 was energized again places the condenser 64 in its charging condition by connecting the cathode of tube 62 to the upper terminal of transformer 61, the lower terminal of said transformer being permanently connected to the grid of said tube 62 through said condenser 64, as above described. This circuit between the upper terminal of the secondary of transformer 61 and said cathode of said tube 62 may be traced as follows: From said upper terminal of transformer 61 by conductor 76 to the now closed upper contact of switch group 78, then through the central spring thereof to conductor 77 through the now closed intermediate contact of relay 22, then by way of conductor 71 to said cathode of tube 62. This starts a recharging of the condenser 64 for a repeat function of that previously described. At the upper contacts 85 the switch 75 closes the holding circuit for itself and for relay 32 when it is energized, which holding circuit extends from conductor 23 by way of conductor 86 to the now closed upper contacts 85 of switch 75, then through the coil of switch 75 to conductor 83, through the normally closed contacts of relay 84 to conductor 82 and then to conductor or line 24. The relays 75 and 32 will thus remain in their upper or energized condition once they are put in that condition, as aforedescribed, until the tube 63 is rendered conducting or is fired, all the while the vibratory motor or conveyor will be operating at its low predetermined amplitude of vibration the value of which amplitude of vibration may be variable determined by adjusting the tap 31. Likewise the time interval during which this amplitude is maintained may be adjusted by adjusting resistor 67, or condenser 65, or both, as above mentioned. After the charge on condenser 65 has leaked off to allow tube 63 to fire, it will do so and current will flow in its plate circuit and through the winding of relay 84 which is preferably provided with a protecting condenser across its terminals. The plate or output circuit for tube 63 extends from the plate or anode through the winding of relay 84 to conductor 76 which is permanently connected to the upper terminal of transformer 61. The cathode of said tube 63 is now connected by way of conductor 73 to the central spring of group of contacts 74 which is now in contact with the upper contact of this group which is connected to conductor 79 leading to conductor 70 which is permanently connected to the lower terminal of the secondary winding of transformer 61. When tube 63 thus fires after said predetermined time interval, it energizes relay 84 which opens its normally closed contacts, thus breaking the holding circuit for relay 75 which is thereby deenergized and returns to its normal condition. When it returns to its normal condition it breaks the holding circuit for the winding of relay 32 through its contacts 85 and said relay 32 returns to its normal or deenergized condition whereupon the vibratory conveyor or motor operates at its high predetermined rate of vibration which may be variably adjusted by adjusting the tap 30. The entire system is thus restored to the condition which existed when relay 22 was first energized and consequently the cycle of operation above described will repeat itself continuously until the system is shut down, as, for example, by opening the switch 12.

From the above description it is manifest that I have provided a very flexible and sensitive control system for a vibratory motor or feeder. For example, in operation, the vibratory motor or feeder is first caused to operate at one rate which rate is preferably but not necessarily maintained substantially constant at any pre-selected value which may be variably adjusted over a wide range. This operation is maintained for a pre-selected time interval, which time interval may likewise be adjusted over a relatively wide range. Following said predetermined time interval the vibratory motor or conveyor will automatically operate at a different amplitude of vibration and this amplitude may be adjusted to any one of a plurality of different values. In the illustration given the motor first operates at a higher value for the first period than during the second period but this condition may be reversed. The time for the second period may be variably adjusted quite independently of the time of the first period and in one particular installation which I have made it was for an appreciably longer period than the first period, although it may be either longer or shorter, entirely at the will of the operator.

The system is particularly adapted for controlling vibratory conveyors or feeders of well known construction known in the art as Traylor feeders. It is obvious, however, that the system is not limited even to vibratory feeders or conveyors but may extend to various types of vibratory motors and may even be extended to rotary type feeders or conveyors, in which case the pickup device 25 might, for example, be a small generator, the speed of which would depend upon its speed of rotation. The timer mechanism 60 is obviously capable of general application.

It may also be stated that while I preferably provide automatic amplitude control mechanism as a feature of the invention, as this is particularly useful for accurate control of the feed rate of the vibratory feeder. If desired, in certain broader aspects of the invention, this amplitude control may be omitted and if it is omitted the relay 32 will simply control resistors, reactors, or the like, in the control circuit of the vibratory or other feeder or conveyor.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In an electrical system, the combination with a vibratory motor, of means responsive to variations in the amplitude of vibration of said motor for maintaining said amplitude substantially constant at a predetermined value, and electrical means for changing said amplitude to a different predetermined value after a predetermined period.

2. In an electrical system, a feeder, and electrical timer means operative to change the normal feed rate thereof from one value to a different value after it has operated at said one value for a predetermined time.

3. In an electrical system, the combination with a vibratory motor, of means responsive to variations in the amplitude of vibration of said motor for maintaining said amplitude substantially constant at a predetermined value, and electrical means for changing said amplitude to a different value after a predetermined period.

4. In an electrical system, an electromagnetic feeder having a motor, means responsive to the feed rate of said feeder for maintaining it substantially constant at either of two preselected values, and timer means operative automatically to maintain said feed rate at one of said values for a predetermined time and then change it to the other value, said timer means including relay means operable to two different positions, circuits including a pair of electron tubes adapted to be successively energized, the circuits being such that when one tube is energized the relay means is in one position and when the other is energized said relay means is in the other position, each tube including a grid circuit having a condenser therein which is charged while said tube is de-energized and after the charge leaks off in a predetermined time said tube becomes energized to operate said relay means.

5. In an electrical system, an electromagnetic feeder having a motor, means responsive to the feed rate of said feeder for maintaining it substantially constant at either of two preselected values, and timer means operative automatically to maintain said feed rate at one of said values for a predetermined time and then change it to the other value, said timer means including relay means operable to two different positions, circuits including a pair of electron tubes adapted to be successively energized, the circuits being such that when one tube is energized the relay means is in one position and when the other is energized said relay means is in the other position.

6. A timer means including relay means operable to two different positions, circuits including a pair of electron tubes adapted to be successively energized, the circuits being such that when one tube is energized the relay means is in one position and when the other is energized said relay means is in the other position, each tube including a grid circuit having a condenser therein which is charged while said tube is de-energized and after the charge leaks off in a predetermined time said tube becomes energized to operate said relay means.

7. An electronic timer comprising a pair of electron tubes having control grids or the equivalent, a circuit for the plates of said tubes including a normally open contact relay in one plate circuit and a normally closed contact relay in the other, relay means including a switch controlled by the combined action of said two relays, said switch having one position when both of said relay contacts are closed and another when either is open, and means to successively energize the plate circuits of said tubes, at least one for a predetermined time interval, said means including said relay means and also including chargeable condensers in the grid circuits of said tubes.

8. An electronic timer comprising a pair of electron tubes having control grids or the equivalent, a circuit for the plates of said tubes including a normally open contact relay in one plate circuit and a normally closed contact relay in the other, relay means including a switch controlled by the combined action of said two relays, said switch having one position when both of said relay contacts are closed and another when either is open, and means to successively energize the plate circuits of said tubes, said means including said relay means and also including chargeable condensers in the grid circuits of said tubes.

9. An electronic timer comprising a pair of electron tubes having control grids or the equivalent, a circuit for the plates of said tubes including a normally open contact relay in one plate circuit and a normally closed contact relay in the other, relay means including a switch controlled by the combined action of said two relays, said switch having one position when both of said relay contacts are closed and another when either is open, and means to successively energize the plate circuits of said tubes, at least one for a predetermined time interval.

10. An electronic timer comprising a pair of electron tubes having control grids or the equivalent, a circuit for the plates of said tubes including a normally open contact relay in one plate circuit and a normally closed contact relay in the other, relay means including a switch controlled by the combined action of said two relays, said switch having one position when both of said relay contacts are closed and another when either is open, and means to successively energize the plate circuits of said tubes.

CLYDE W. BAIRD.